(12) United States Patent
Quilici et al.

(10) Patent No.: US 11,363,139 B2
(45) Date of Patent: *Jun. 14, 2022

(54) IDENTIFYING, SCREENING, AND BLOCKING OF CALLS FROM PROBLEMATIC TELECOMMUNICATIONS CARRIERS AND NUMBER BLOCKS

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,883

(22) Filed: Jul. 13, 2020

(65) Prior Publication Data

US 2020/0412871 A1 Dec. 31, 2020

Related U.S. Application Data

(63) Continuation of application No. 16/451,318, filed on Jun. 25, 2019, now Pat. No. 10,757,252.

(51) Int. Cl.
*H04M 1/57* (2006.01)
*H04M 3/436* (2006.01)
*H04M 1/663* (2006.01)

(52) U.S. Cl.
CPC ......... *H04M 3/4365* (2013.01); *H04M 1/573* (2013.01); *H04M 1/575* (2013.01); *H04M 1/663* (2013.01)

(58) Field of Classification Search
CPC ............... G06T 11/001; G06T 7/90; G06T 2207/20212; G06T 2207/10048;
(Continued)

(56) References Cited

U.S. PATENT DOCUMENTS 5,625,680 A 4/1997 Foladare et al.
6,298,122 B1 10/2001 Horne
(Continued)

OTHER PUBLICATIONS

Ram Dantu, et al., Detecting Spam in VoIP Networks, pp. 31-37, SRUTI '05: Steps to Reducing Unwanted Traffic on the Internet Workshop, USENIX Association, 2005.
(Continued)

*Primary Examiner* — Chuong A Ngo
(74) *Attorney, Agent, or Firm* — Meister Seelig & Fein LLP; Seth H. Ostrow, Esq.

(57) ABSTRACT

A method and systems for identifying communicators as wanted or unwanted based on communications from such communicators, the method comprising determining communications from phone numbers as being unwanted by analyzing communication content features of communications associated with unwanted communicators, identifying telecommunications carriers that acquired the phone numbers, computing scores for the telecommunications carriers based on an amount of the determined unwanted communications from the phone numbers are unwanted, intercepting an inbound communication from a given phone number, identifying the given phone number is associated with a given one of the telecommunications carriers, and configuring handling of communications from the phone number based on a score of the given telecommunications carrier.

25 Claims, 5 Drawing Sheets

(58) Field of Classification Search
CPC ..... G06T 5/50; G01J 5/025; G01J 2005/0077; G01J 5/48; G01N 25/72; G06F 3/0484; G01D 7/00; H04N 7/18; H04M 3/4365; H04M 1/575; H04M 1/573; H04M 1/663; H04M 2201/18; H04M 2203/556
See application file for complete search history.

(56) References Cited

U.S. PATENT DOCUMENTS

| | | |
|---|---|---|
| 6,307,926 B1 | 10/2001 | Barton et al. |
| 6,330,317 B1 | 12/2001 | Garfinkel |
| 6,385,310 B1 | 5/2002 | Holiday, II |
| 6,549,619 B1 | 4/2003 | Bell et al. |
| 6,697,461 B1 | 2/2004 | Middleswarth et al. |
| 6,853,717 B1 | 2/2005 | Frentz et al. |
| 6,990,187 B2 | 1/2006 | MacNamara et al. |
| 7,027,576 B2 | 4/2006 | Schwab et al. |
| 7,099,444 B1 | 8/2006 | Russell |
| 7,127,050 B2 | 10/2006 | Walsh et al. |
| 7,162,019 B1 | 1/2007 | Mullis et al. |
| 7,236,577 B2 | 6/2007 | Lection et al. |
| 7,295,660 B1 | 11/2007 | Higginbotham et al. |
| 7,372,948 B2 | 5/2008 | Walsh et al. |
| 7,593,517 B2 | 9/2009 | Walsh et al. |
| 7,613,286 B2 | 11/2009 | Hong |
| 7,953,214 B2 | 5/2011 | Horne |
| 8,085,916 B2 | 12/2011 | Walsh et al. |
| 8,243,909 B2 | 8/2012 | Wood et al. |
| 8,326,334 B2 | 12/2012 | Kim et al. |
| 8,416,938 B2 | 4/2013 | Wood et al. |
| 8,467,512 B2 | 6/2013 | Amir et al. |
| 8,548,149 B2 | 10/2013 | Czachor, Jr. et al. |
| 8,548,447 B1 | 10/2013 | Kirchhoff et al. |
| 8,577,002 B2 | 11/2013 | Stein et al. |
| 8,781,093 B1 | 7/2014 | Rybak et al. |
| 8,787,549 B2 | 7/2014 | Wood et al. |
| 9,060,057 B1 | 6/2015 | Danis |
| 9,544,431 B2 | 1/2017 | Zhang et al. |
| 9,699,309 B2 | 7/2017 | Spievak et al. |
| 10,111,102 B2 | 10/2018 | Flaks et al. |
| 10,291,774 B2 | 5/2019 | Qin et al. |
| 10,477,403 B2 | 11/2019 | Flaks et al. |
| 10,601,986 B1 * | 3/2020 | Botner ............. H04M 3/42068 |
| 10,666,792 B1 | 5/2020 | Marzuoli et al. |
| 2003/0072426 A1 | 4/2003 | Davidson et al. |
| 2004/0196968 A1 | 10/2004 | Yue |
| 2005/0207557 A1 | 9/2005 | Dolan et al. |
| 2005/0271196 A1 | 12/2005 | Florkey et al. |
| 2007/0071212 A1 | 3/2007 | Quittek et al. |
| 2007/0121825 A1 | 5/2007 | Walsh et al. |
| 2007/0143422 A1 | 6/2007 | Cai |
| 2008/0084975 A1 | 4/2008 | Schwartz |
| 2008/0292077 A1 | 11/2008 | Vinokurov et al. |
| 2009/0147930 A1 | 6/2009 | Rice |
| 2010/0278325 A1 | 11/2010 | Singh et al. |
| 2011/0280160 A1 | 11/2011 | Yang |
| 2012/0128144 A1 | 5/2012 | Chislett et al. |
| 2012/0287823 A1 | 11/2012 | Lin |
| 2015/0087280 A1 * | 3/2015 | Farrand ................ H04M 1/663 455/415 |
| 2015/0195403 A1 | 7/2015 | Goulet et al. |
| 2015/0373193 A1 | 12/2015 | Cook |
| 2016/0150414 A1 | 5/2016 | Flaks et al. |

OTHER PUBLICATIONS

J. Quittek, et al., Detecting SPIT Calls by Checking Human Communication Patterns, International Conference on Communications 2007, IEEE, 2007.

Yan Bai, et al., Detection and Filtering Spam over Internet Telephony—A User-behavior-aware Intermediate-network-based Approach, pp. 726-729, 2009 IEEE International Conference on Multimedia and Expo, IEEE, 2009.

Vincent M. Quinten, et al., Analysis of Techniques for Protection Against Spam over Internet Telephony, pp. 70-77, Springer-Verlag Berlin Heidelberg 2007, 2007.

Huanhong Tu, et al., SoK: Everyone Hates Robocalls: A Survey of Techniques against Telephone Spam, pp. 320-338, 2016 IEEE Symposium on Security and Privacy, 2016.

PCT International Search Report of PCT/US20/39562, dated Jul. 30, 2020, International Search Authority.

* cited by examiner

IDENTIFYING, SCREENING, AND BLOCKING OF CALLS FROM PROBLEMATIC TELECOMMUNICATIONS CARRIERS AND NUMBER BLOCKS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to monitoring telecommunications carriers, and in particular, automatically detecting and handing calls based on unwanted communications attributable to a particular carrier's behavior and attributes.

Description of the Related Art

Telephone users may receive calls from callers that such users generally and collectively agree are unwanted—typically because the caller is unsolicited, such as a telemarketer who is sequentially or randomly calling upon the audience and is not one of such users' typical known callers with which such users' have a pre-existing relationship. This is particularly true in mobile communication systems where mobile telephone users will often be interrupted at any time by unwanted calls. In addition, unsolicited messages may be left in voice mail systems of users who configure their landline and wireless telephone devices to forward their unanswered calls to such voice mail systems to answer their unanswered phone calls. Voice mail left by unwanted callers is an especially expensive problem for users who must retrieve messages from the voice mail system via cell phones, long distance calls, or transcriptions. Voice mail left by unwanted callers causes users to spend real dollars (air time, per minute charges, toll free charges to enterprise, voicemail transcription, etc.) and waste precious time on messages to which they do not want to listen.

Furthermore, certain carriers may be more likely to be the originator of an unwanted communication than others based on the ease at which a temporary disposable number may be obtained, or by their lack of participation in certain mechanisms that dissuade or prevent undesirable communications behavior such as but not limited to spoofing origination numbers.

Current solutions for identifying unwanted solicitors rely on a predetermined list of unwanted solicitors. For example, caller identification (ID) systems allow recipients to screen the source of incoming calls, but many callers can either "spoof" a fake number to avoid recognition or block their Caller ID information entirely so that no information is provided to a recipient about the caller. Call-blocking features allow recipients to block callers from specific phone numbers and those that intentionally block their calling information. Government telemarketing restriction lists allow recipients who take certain specific steps to be listed as people who do not wish to be called by telemarketers, but such lists are not fully effective to avoid unwanted telephone calls.

The above solutions do not adequately provide full protection from unwanted phone calls. Accordingly, additional technology is still needed in order to enable effective call blocking.

SUMMARY OF THE INVENTION

The present invention provides a method and systems for identifying communicators as wanted or unwanted. According to one embodiment, the system comprises a directory server comprising memory and a processing device configured to determine communications from phone numbers as being unwanted by analyzing communication content features of communications associated with unwanted communicators, identify telecommunications carriers that acquired the phone numbers, and compute scores for the telecommunications carriers based on the quantities and qualities of unwanted communications originating from the carriers. The system further comprises a communication screening system configured to intercept an inbound communication from a given phone number, identify if the given phone number is associated with a given one of the telecommunications carriers, and configure handling of communications from the phone number based on a score which is influenced but not wholly dependent on past behavior of the given telecommunications carrier.

The directory server may determine the scores of the telecommunications carriers based on an aggregation of data of prior and current behavior gathering by monitoring of traffic or reported instances of positive or negative communication behaviors by the telecommunications carrier. In one embodiment, the communication screening system may prompt for a response from the given phone number to record a digital sample. In a further embodiment, the communication screening system may extract data from the inbound communication to record the communicator's information and behavior as a digital sample. The inbound communication may include a voice message or a bi-directional conversation.

The communication screening system may further configure the handling of communications by at least one of suppressing auditory and/or visual indication of an incoming communication, blocking the phone number, playing a message that indicates unavailability to the origination communication device, playing a message to the origination communication device to challenge if it is a wanted communication, and ending a communication connection with the origination communication device. The communication screening system may also be configured to block numbers belonging to a series of ranges or matched patterns based on an originating and destination phone number. The directory server can compare the inbound communication to fingerprints stored in a database. The fingerprints may comprise sequences of characters that are representative of content of known communications. The directory server may dynamically compute the scores for the telecommunications carriers by tracking percentages of unwanted communications from the telecommunications carriers. The directory server may further detect spoofing of the numbers associated with the communications associated with the unwanted communicators and adjust the scores for the telecommunications carriers based on the detection of spoofing.

According to another embodiment, the system comprises a processor and a memory having executable instructions stored thereon that when executed by the processor cause the processor to determine communications from phone numbers as being unwanted by analyzing communication content features of communications associated with unwanted communicators, identify telecommunications carriers that acquired the phone numbers and originated the communication via the phone numbers, compute scores for the telecommunications carriers based on an amount of the determined unwanted communications from the phone numbers are unwanted, intercept an inbound communication from a given phone number, identify the given phone number is associated with a given one of the telecommunications carriers, and configure handling of communications from the phone number based on a score of the given telecommunications carrier.

According to one embodiment, the method comprises determining communications from phone numbers as being unwanted by analyzing communication content features of communications associated with unwanted communicators, identifying telecommunications carriers that acquired the phone numbers and originated the communication via the phone numbers, computing scores for the telecommunications carriers based on an amount of the determined unwanted communications from the phone numbers are unwanted, intercepting an inbound communication from a given phone number, identifying the given phone number is associated with a given one of the telecommunications carriers, and configuring handling of communications from the phone number based on a score of the given telecommunications carrier.

The method may further comprise determining the score of the telecommunications carrier based on a monitoring of traffic or reported instances of positive or negative communication behaviors by the telecommunications carrier. A response may be prompted from the given phone number to record a digital sample. Data may be extracted from the inbound communication to record the digital sample. The inbound communication may include a voice message.

The scores for the telecommunications carriers may be computed by tracking percentages of unwanted communications from the telecommunications carriers. The handling of communications may be configured by at least one of blocking the phone number, playing a message that indicates unavailability to the origination communication device, and ending a communication connection with the origination communication device. The method may further comprise blocking numbers belonging to a series of ranges or matched patterns based on an originating and destination phone number.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
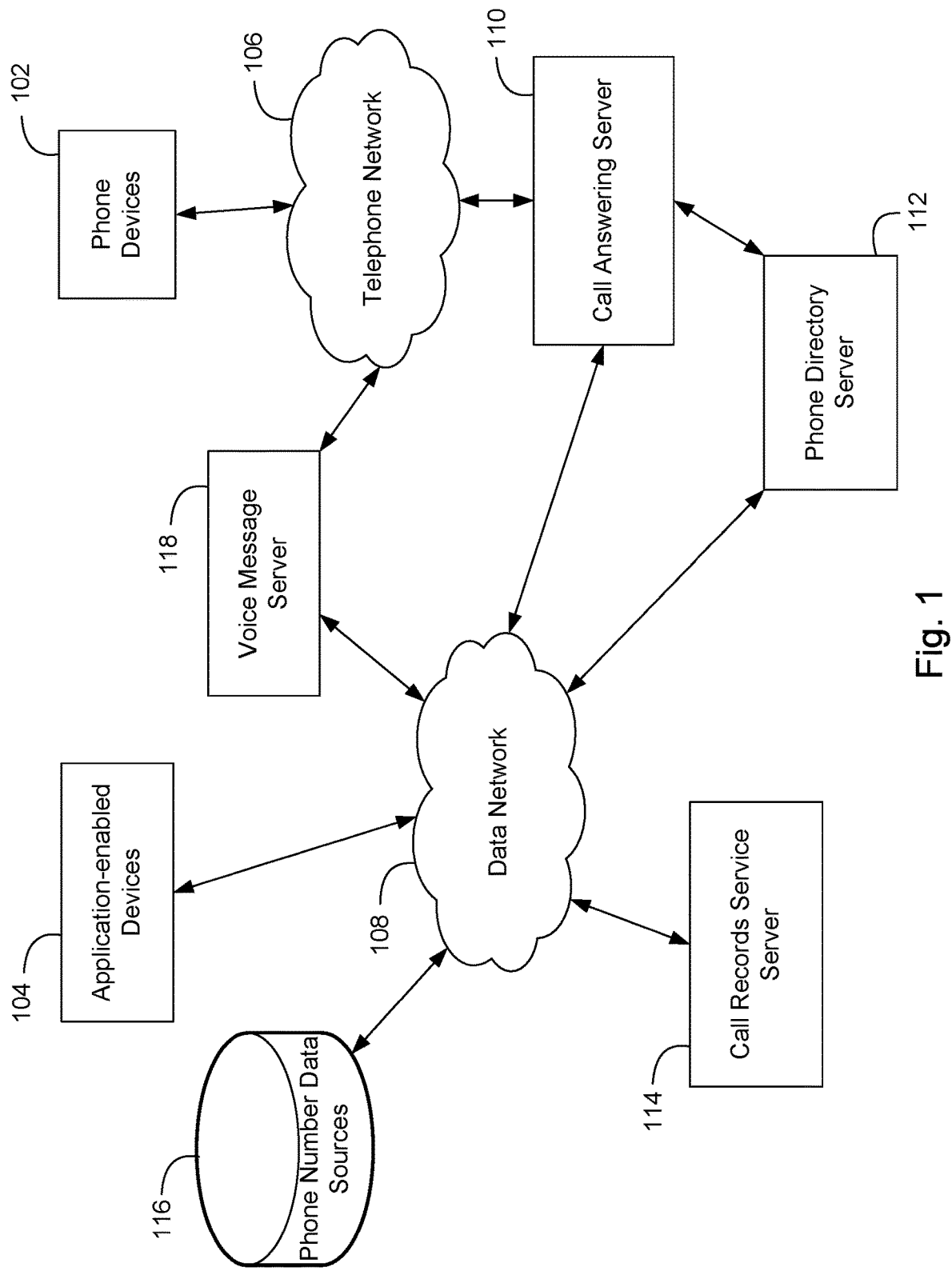
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses systems and method for detecting desirable and undesirable behavior in the communications related to given telecommunications carriers and the utilization of such in the handling of calls from such carriers in the absence or presence of other information about a given communication. Problematic telecommunications carrier behavior may include a carrier originating large amounts of unwanted calls. The carriers may purchase blocks of numbers e.g., 1000 consecutive numbers, which can then be given to their customers to use. For example, certain telecommunications carriers may acquire blocks of phone numbers and wholesale them to customers, such as "robocallers" who are more likely to purchase blocks of numbers. Examples of such carriers may include Peerless Network, Paetec Communications, Teleport Communications, XO Communications, and Broadview Networks. Calls originating from such carriers may be handled with additional scrutiny by, for example, running tests on the data in the call, requiring the caller to authenticate or verify their identity, provide audio challenges, or blocking calls. The additional scrutiny could be determined to be applicable or inapplicable depending on if the incoming communication matches the phone number of a stored contact on the receiving telecommunication device. These carriers may also be scored based on a percentage of calls originating from numbers they acquired being unwanted calls (e.g., spam and robocallers). Calls originating from carriers with scores reflecting high undesirable traffic or other questionable attributes may be scrutinized more often and handled under more stringent screening procedures. At least one disclosed system may identify carriers having large amounts of unwanted call traffic and block calls or otherwise provide different levels of screening for calls from such carriers unless specified, e.g., placed on a whitelist.

The system presented in FIG. 1 includes phone devices 102 (such as landline, cellular, analog, digital, satellite, radio, etc.), that are capable of establishing and receiving telephonic communications via a public telephone network 106, as well as application-enabled devices 104 that are capable of establishing and receiving telephonic communications via the data network 108 (e.g., using Voice over Internet Protocol ("VoIP")). In some embodiments, the application-enabled devices 104 are enabled with an application such as the one available from YouMail Inc., www.youmail.com, the assignee of the present patent application. The presence of a voice message server 118 is optional and not required in the system, but if present can be utilized to augment available data.

According to one embodiment, the data network 108 may include the Internet or a private VPN (virtual private network), or any other communications network. Application-enabled devices 104 may be a computing device capable of executing a telephony-related application (e.g., WiFi calling system, VoIP phone, etc.). Examples of computing devices include personal computers, television set top boxes, mobile smartphones, laptops, personal digital assistants (PDA), tablet computers, e-book readers, smartwatches and smart wearable devices, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio and video. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via email, short message service (SMS), or multimedia message service (MMS).

The system further includes a call records service server 114, a phone directory server 112, and a call answering server 110. These servers may vary widely in configuration or capabilities, but generally a server each includes one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Call records service server 114 is able to accumulate phone numbers (or addresses, or unique IDs) and information about the phone numbers from a variety of sources that can be used to determine if a given phone number is that of e.g., an unwanted communicator, or a wanted communicator. One such source is the application-enabled devices 104, which may send a list or log of calls made and received, recordings or transcriptions of phone call conversations (e.g., voicemail transcription systems, such as, one provided by the application from YouMail as mentioned above), text messages, and a list of contacts including phone numbers and associated IDs to the call records service server 114 over the data network 108. Other sources may include voice message server 118 and call answering server 110. Voice message server 118 and call answering server 110 may perform voice mail operations such as recording (and/or transcribing) voice messages for subscribers of phone devices 102 and application-enabled devices 104, where the recorded or transcribed voice messages can be forwarded to call records service server 114. The call answering server 110 may optionally present challenges to communications and the details of interacting with those challenges can be made available to or sent to the call records service server 118. Yet another source of information for accumulation in the call records service server 114 include publicly available phone number data sources 116, such as, telephone listings and directories, electronic yellow pages, and the like. Call records service server 114 may search phone number data sources 116 for information about certain numbers including information about their carrier, the owner of the numbers, addresses, etc. Still other possible sources of information for populating the call records service 114 include cell phone billing records, telephone and cable service provider records such as CDRs (call detail records), and the like.

In at least one embodiment, the call records service server 114 may create one or more databases including "fingerprints" or digital signatures of known recordings of calls or messages (voice and/or text) from unwanted or wanted communicators by using speech processing, natural language processing, and machine learning algorithms with the information accumulated from the variety of sources. Each fingerprint may uniquely identify a sequence of characters or audio fingerprint such as a spectrogram designed to capture the content of, for example, a commonly appearing or known audio phrase or message. In another embodiment, a fingerprint may comprise a tag cloud, or alternatively, a weighted list, that includes each keyword that appears in the message and the number of times each keyword appears in the message that is used to summarize the content. A tag cloud (also known as, a word cloud or a text cloud) may comprise a representation of text content data including keywords or tags, and an emphasis of importance of each keyword or tag that may be indicated with a variety of indicators, such as, ranking, arrangement, classification, word count, font size and color. Further description and details of fingerprinting are described in further detail in commonly owned U.S. Pat. No. 10,051,121, entitled "SYSTEM AND METHOD FOR IDENTIFYING UNWANTED COMMUNICATIONS USING COMMUNICATION FINGERPRINTING" which is herein incorporated by reference in its entirety.

The phone directory server 112 may receive or retrieve the phone numbers and information about the phone numbers from the call records service server 114. For each phone number, indications of likelihood that the phone number is that of an unwanted communicator may be provided by call records service server 114 to the phone directory server 112. Phone directory server 112 may include logic that determines the likelihood that a particular number is that of an unwanted communicator based on the information about the phone numbers from records service server 114 by using the techniques described herein. For example, the indication of likelihood may be represented by a binary flag indicating whether or not the number has been determined as exceeding a threshold value set as likely to be that of an unwanted communicator. Alternatively, the likelihood may be represented with a score value computed as the likelihood of representing an unwanted communicator based on a set of quantitative rules. In another embodiment, an indication may be retrieved from the call records service server 114 that explicitly identifies a phone number as an unwanted communicator (or categorized otherwise). Phone directory server 112 may also match inbound calls or messages with the known fingerprints from records service server 114 to calculate a score that reflects a degree of overlap between the inbound calls or messages and one or more fingerprints.

The logic of phone directory server 112 may additionally use various sets of rules to help it determine the likelihood or probability of a number being that of an unwanted communicator. For example, phone directory server 112 may also factor in the carrier from which the call originated. Certain carriers are associated with a high percentage of robocalls and are suspected or known to traffic with robocalling business. Other carriers may be set to have known attributes that affect the likelihood of wanted or unwanted calls, such as the carrier having taken additional steps to ensure calls from their network are not spoofed. The phone directory server 112 system may track a total volume or percentage of robocalls/unwanted communications associated with carriers or block of numbers belonging to the carriers and dynamically score the carriers or block of numbers (collectively referred to as a "carrier score"). If a given carrier score exceeds a threshold, either as an absolute number, e.g., 50% (of traffic being undesirable or questionable), or in comparison to other carriers or block of numbers, the associated carrier/block of numbers may be identified as bad or suspicious. There could be levels based on scores where different measures are taken depending on the level. For example, audio challenges, such as CAPTCHA ("completely automated public Turing test to tell computers and humans apart"), may be deployed on callers with difficulty levels that are influenced by the carrier score. In another example, a coding system e.g., color coding presented to a recipient the level of likelihood a caller being an unwanted caller/robocaller, that is based at least in part on the carrier score.

The phone directory server 112 may monitor carrier traffic (e.g., reported by users, by analyzing communication content features (or fingerprints) being associated with either wanted or unwanted communicators, and/or by identifying likelihood of a wanted or unwanted communicator) and adjust their score accordingly so the carrier's or block of number status can change dynamically. The carrier scoring may also take into account how the robocallers (or other bad callers) got on their network. For example, if the robocallers were detected as neighborhood spoofers, the carrier would not be penalized for those bad callers. The percentage of unknown callers, that is, not just those determined to be unwanted/robocalls but those that are simply unknown, on a carrier may also be tracked and factored into the dynamic scoring. Some carriers may sell numbers to other entities, and chains of custody may be tracked to determine which carrier is attributed to the activities of the numbers. In other cases, a current traffic from blocks of numbers that belong to a carrier may be identified as a block rather than a carrier. For example, a spammer may obtain a block of 100 numbers from a given carrier and begin a pattern of sequentially using those numbers to place unwanted calls. This block of 100 numbers could be cataloged in a manner that weighs that block as unwanted rather than the entire carrier.

The call answering server 110 may be configured to screen or filter calls to phone devices 102 and application-enabled devices 104. Calls directed to phone devices 102 and application-enabled device 104 may be intercepted by call answering server 110. Phone directory server 112 may be queried by call answering server 110 to identify whether inbound calls to the receiving devices from specific numbers are likely to be from either unwanted communicators or wanted communicators. The call answering server 110 may also determine that the inbound calls are associated with carriers identified as bad or suspicious or match fingerprints from unwanted communicators and can take various measures.

If call answering server 110 determines that the given number is likely to be the number of an unwanted communicator, such as from a suspicious carrier or carrier block, calls from the given number can be handled appropriately (e.g., silenced, marked as spam, etc.) as suspect calls unless the user has placed the given communicator on their white/permitted caller lists or if the call is matched to one or more fingerprints that identifies it as a wanted call. Alternatively, additional tests could be run on those calls by default such as audio CAPTCHA, or users could be given the option whether to accept calls from that carrier. Another option is to block phone numbers in a block/series of range of numbers, e.g., a block of 1000 numbers which gets purchased by carriers, or matched patterns based on an origination and destination phone number. For example, if a carrier carries a communicator with the number "646-123-4567," the system may block all number ranging from "123-4000" through "123-4999."

Call answering server 110 may also respond to unwanted communicator calls by playing an appropriate message containing special information tones (SIT) to indicate out of service or disconnect tones to the unwanted communicator and terminate the call. On playing the message, the call answering server 110 may combine or create messages from the carrier of the user and/or the carrier of the communicator to provide a message identical to that the carrier would play for a disconnected number. The message played by call answering server 110 need not be a generic message but can simulate an actual "telco" experience. For example, if a user is a subscriber from a specific carrier, call answering server 110 may play the carrier's specific audio to an unwanted communicator.

Numbers that are determined as being unlikely from an unwanted communicator (or likely from a wanted communicator) may be allowed to call phone devices 102 or application-enabled devices 104 or directed to voice mail operations such as playing a message that the subscriber of the receiving phone device is unavailable and the communicator may record a voice message. Alternatively, the call answering server may intercept calls from an unwanted communicator and perform any of the following: 1) report to the communicator that the person they are calling does not accept these kinds of calls, 2) report to the communicator that the person they are calling does not accept any calls, and 3) hang up on the communicator and/or optionally play a disconnected message. Handling of calls from communicators can be equally applied to other communications such as SMS (short message service)/text messaging or the like which are carried by carriers (as opposed to transmitted over WiFi). Further description and details of call answering systems are described in further detail in commonly owned U.S. Pat. No. 9,591,131, entitled "SYSTEM AND METHOD FOR IDENTIFYING UNWANTED CALLERS AND REJECTING OR OTHERWISE DISPOSING OF CALLS FROM SAME" which is herein incorporated by reference in its entirety.

Figure 2:
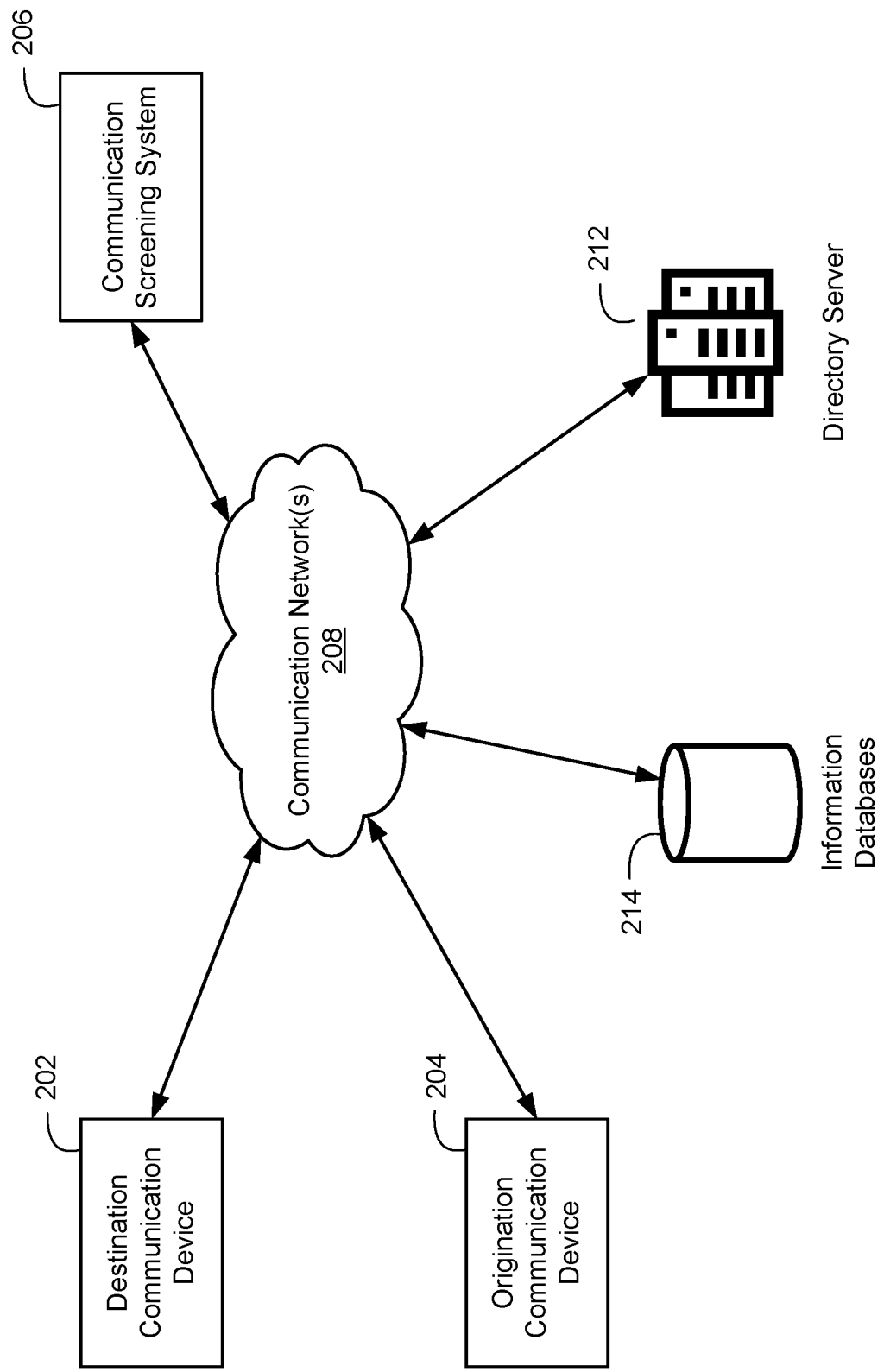
FIG. 2 illustrates another computing system according to an embodiment of the present invention.

FIG. 2 presents a system for screening communications between communication devices according to an embodiment of the present invention. The system includes a destination communication device 202 and an origination communication device 204 that are communicatively coupled by communication network(s) 208. Destination communication device 202 and origination communication device 204 may comprise any device or circuitry capable of receiving and/or sending voice or textual communications. Communication network(s) may comprise one or more telephone and data networks operable to transport telecommunications and message data. The origination communication device 204 may initiate a communication, such as a call, text message, or voice message, to destination communication device 202.

Communication screening system 206 may be configured to screen or filter communications that are directed to destination communication device 202. The communication screening system 206 may comprise a computing device including memory and processing devices, such as a server computer, or a service interface on a cloud computing platform, that is configurable by destination communication device 202 to monitor communications to destination communication device 202. A communication intended for the destination communication device 202 may be received from an origination communication device 204 and intercepted by communication screening system 206. Intercepting the communication may include prompting for a response (audio or textual) from the communicator of the origination communication device 204 or extracting data from the inbound communication to record a digital sample of the communication. The communication screening system 206 may also identify a phone number or identifier associated with the origination communication device 204. Communication screening system 206 may submit to and query directory server 212 with the sampled communication and the phone number or identifier. Communication screening system 206, directory server 212, and information databases 214 may exist in various embodiments as either separate systems, or collectively as components of a single system.

Directory server 212 may provide information results that can be used to determine whether the inbound communication is from an unwanted communicator or a wanted communicator. For example, the directory server 212 may include or is communicatively coupled to a database of fingerprints that are created from known recordings of calls or messages from unwanted or wanted communicators. The directory server 212 may compare the sampled communication from the origination communication device 204 with fingerprints in the database of fingerprints and/or provide a match analysis. Additionally, directory server 212 may calculate a score of a carrier or block of numbers belonging to that carrier servicing the phone number or identifier. The score may be calculated based on a monitoring of traffic, reported instances of positive or negative communication behaviors by the carrier or block of numbers, or other known attributes of that carrier (such as if that carrier enforces anti-spoofing measures in its communications).

The directory server 212 may return a result including fingerprint matches and a carrier or number block score for the origination communication device 204 based on the information provided by the communication screening system 206. Communication screening system 206 may determine whether the inbound communication is either from an unwanted communicator or a wanted communicator based on a combination of the fingerprint matches and the carrier or number block score. If the inbound communication is determined to be from an unwanted communicator, screening system 206 can take various measures, such as, suppressing any visual or auditory indications of the communication, performing a CAPTCHA test, blocking the origination communication device 204, playing a message that indicates unavailability, labeling of any recorded communication as potential spam (e.g., in a spam folder, or including a visual label), or ending a communication connection. Otherwise, if the inbound communication is not determined to be from an unwanted communicator, the call screening system 206 may allow the communication between the origination communication device 204 and the destination communication device 202. Communication screening system 206 may perform similar or identical functions as disclosed herewith with respect to call answering server 110.

Figure 3:
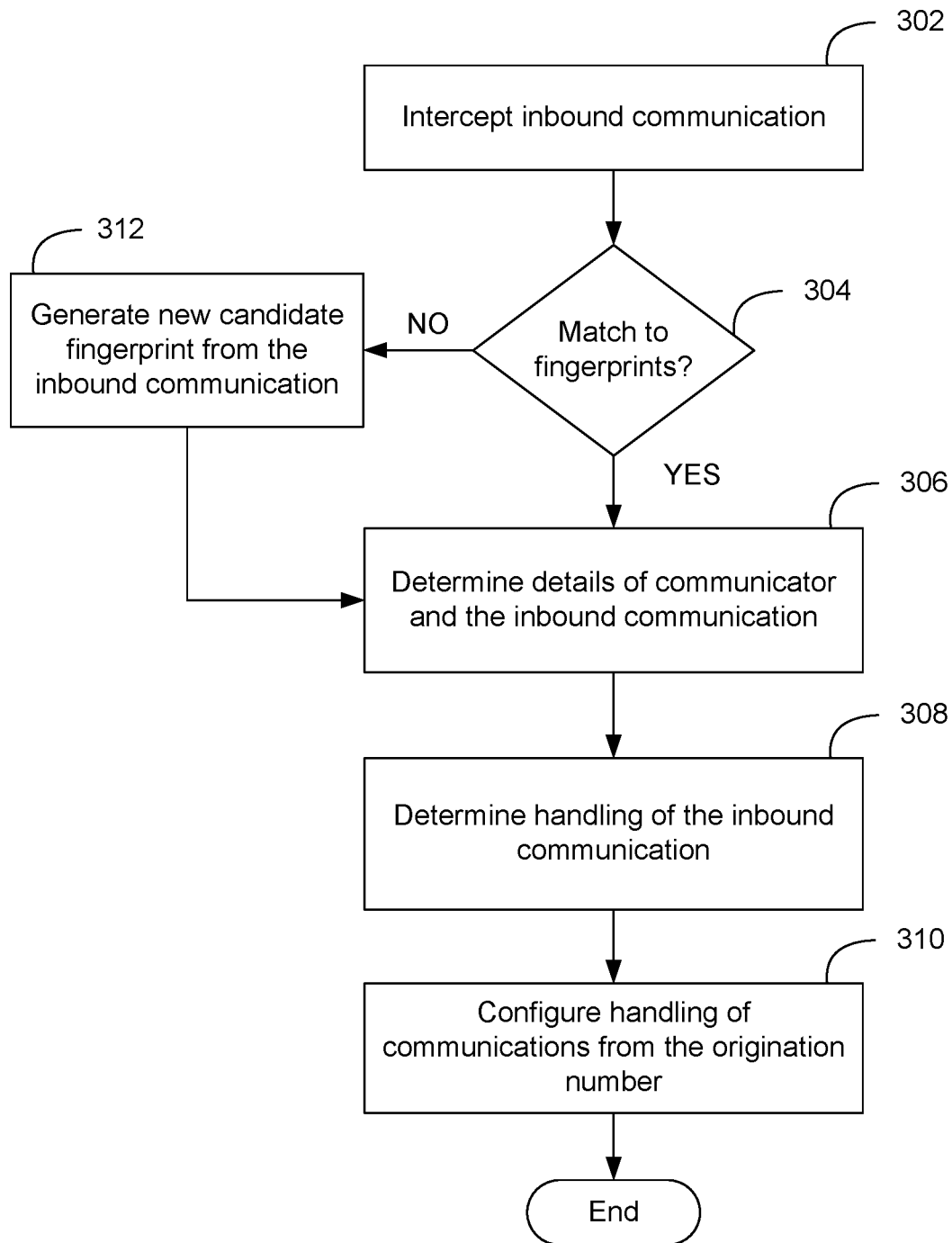
FIG. 3 illustrates a flowchart of a method for identifying unwanted communicators according to an embodiment of the present invention.

FIG. 3 presents a flowchart of a method for identifying unwanted communicators according to an embodiment of the present invention. An inbound communication is intercepted, step 302. The inbound communication may be a voice call, short message service (SMS) text, or voice message that is directed to an intended recipient from a communicator. The communicator may be either unwanted, wanted, or may have an unknown phone number, address, or otherwise unique ID. Inbound communications may be transcribed and turned into a form suitable for analysis and matching (e.g., text) using machine learning along with speech recognition and processing techniques. Exemplary methods and algorithms that may be used include Hidden Markov models, neural networks, deep learning, and end-to-end automatic speech recognition, to name a few. A suitable form may include a string of characters, or alternatively, a tag cloud.

The inbound communication is compared to fingerprints from a database, step 304. A digital sample of the inbound communication may be extracted and analyzed to determine whether the inbound communication is from an unwanted communicator or a wanted communicator. The database of fingerprints may be created from known recordings of calls or messages from unwanted or wanted communicators. The known recordings of calls or messages may be collected from a plurality of sources such as, voice message servers, call forwarding servers, telco and communication service carriers. The fingerprints may be used for comparison with inbound calls and messages to distinguish unwanted messages from wanted messages as well as identifying a likely identity associated with the communicator of the inbound communication. Identifying a likely identity may include determining a probability that a communicator is wanted or unwanted based on determined similarities between the inbound communication and the fingerprints. For example, the communicator of the inbound communication may be identified as an unwanted caller if the inbound communication is statistically similar (e.g., a 70% match) to one or more fingerprints associated with known unwanted callers. Alternatively, communicator of the inbound communication may be identified as an unwanted caller if a number of statistical matches between the inbound communication and fingerprints associated with known unwanted callers exceeds a particular threshold.

A given fingerprint may comprise features associated with a given message from a phone number of an unwanted communicator. The features may include a phone number, message duration, call frequency, time of call, call recipients, keywords, phrases, speech tone and other speech characteristics (such as, audio characteristics to help ensure matches—e.g., frequency range, whether it's male/female voice). Features of the given fingerprint may be compared to corresponding features extracted from the inbound communication. An aggregated score may be calculated based on a comparison of each feature. For example, certain features may be weighted more highly than others in calculating the aggregated score.

Each fingerprint can be associated with a tag based on whether its content indicates a problematic or safe communicator. An optional identifier including a descriptive or precise name may be associated with a communicator of the fingerprint (e.g., IRS Scam) to identify the communicator when calling. An algorithmic, rules-based approach may be used to determine whether or not a given fingerprint could indicate an unwanted call and what the likely name should be to identify the communicator. For example, the content of the data in the fingerprint may be analyzed, including phone numbers and keywords that appear in the fingerprint using rules such as, if a fingerprint contains a phone number, ID, or address known to be an unwanted communicator (as in the IRS Scam example above), the fingerprint can be tagged as unwanted and use the same name as other fingerprints also containing that phone number, ID, or address. An opposite rule may also be used if the fingerprint contains a known good number to call back, and it can be assumed to be a wanted call. Adding new fingerprints to a fingerprint database may include soliciting feedback from, for example, a human curator to review the information associated with the fingerprint.

The inbound communication may be compared against the known fingerprints of messages using methods and algorithms such as, logistic regression, decision trees, Bayesian network, and clustering to determine how much overlap there is between a given fingerprint and the inbound voice message, and to calculate a matching score. In one embodiment, the comparison can be based on computing longest matching sequences. In another embodiment, the comparison may be based on comparing tag clouds of the known recordings and the inbound communication, and finding a tag cloud from the known recordings with the "best fit." A match of inbound communications with the known fingerprints may be determined based on a score that reflects a degree of overlap between an inbound communication and a given fingerprint. A score that is equal to or exceeds a minimum score may indicate a match. The minimum score may be determined using techniques such as machine learning that is trained with a sample set of messages. Any of the above algorithms used in the comparison may also determine a highest matching score over a minimum acceptable score. Alternatively, a match of inbound communications with known fingerprints may be determined based on a score that reflects the degree of difference between an inbound communication and a given fingerprint.

If the inbound communication does not match any fingerprint, a new candidate fingerprint may be generated from the inbound communication, step 312. Otherwise, the system may proceed directly to determine details of the communicator and the inbound communication based on fingerprint, carrier and number block score, or other attributes, step 306. The system may identify the origination number is associated with a telecommunications carrier. A carrier score may comprise a score for the carrier of the origination number that indicates the likelihood of traffic from the carrier being unwanted. Likewise, a number block score may comprise a score for a block of numbers that indicates the likelihood of traffic from the block of numbers being unwanted. The carrier and number block scores may be determined by referencing a data source of unwanted call statistics associated with the carrier or number block or calculated based on a percentage of suspect traffic or robocalls associated with the carrier or number block by means of communications monitoring. The score may also be calculated based on reported instances of positive or negative communication behaviors by the carrier or block of numbers, or other known attributes of that carrier (such as if that carrier enforces anti-spoofing measures in its communications). Fingerprint, carrier and number block score, and other attributes may be factored with given weightings for determining actions in a next step. For example, a call that is determined to be borderline associated with a VoIP wholesaler may be considered as spam while a call on a carrier with anti-spoofing measures may be considered good or rated favorably.

Appropriate handling of the inbound communication is determined based on a match to any of the fingerprints and/or the carrier and number block scores, step 308. Determining appropriate handling may rely on identification of the communicator as wanted or unwanted based on matching (either a degree of overlap or differences) of the inbound communication to any of the fingerprints, and classifying the communicator as either an unwanted communicator if the inbound communication matches (to a certain degree) one or more fingerprints associated with unwanted communicators, or a wanted communicator if the inbound communication matches (to a certain degree) one or more fingerprints associated with wanted communicators. The carrier or number block scoring may supplement the fingerprint matching, either confirming or intervening. Alternatively, if the carrier or number block scoring exceeds given thresholds, either as an absolute number, e.g., 50% or in comparison to other carriers, indicating a good or bad or suspicious carrier or number block, the communicator may be inferred to be likely as wanted or unwanted communicator, depending on if the carrier or number block scoring indicates such.

Handling of calls from the communicator is configured, step 310. Users may be provided with the option to screen, forward to voicemail, test (e.g., audio CAPTCHA), block, or automatically reject and dispose of future communications from unwanted communicators should their telephone or application-enabled device receive a call or message from an unsolicited communicator. For example, if the communicator of the inbound communication is determined to be an unwanted communicator (from step 308), suppression of audio or visual call indication, CAPTCHA testing, spam labeling, call blocking and out-of-service operations may be configured for the phone number, address, or unique ID associated with the inbound communication.

Out-of-service operations may include playing a sequence of tones to the communicator followed by a "disconnected message" that emulates the behavior of a phone number that is not in service. Alternatively, unwanted communicators may be added to a black list where future calls or messages from phone numbers, addresses, or unique IDs from unwanted communicators are blocked. Additionally, users can configure their devices to not ring or display the inbound communication when they are determined to be unwanted, thus effectively eliminating any personal distraction that may have otherwise experienced upon receiving a call from an unwanted communicator. Users can also configure the communications from unwanted communicators to be labeled as such, as in the case of voice messages, organized in a spam folder or annotated with a spam label. Calls from phone numbers, addresses, or unique IDs of wanted communicators may be configured (e.g., placed on a white list) for unimpeded calling to a user's device or normal voice mail operations that allows a communicator to leave a message and access normal answering service operations. This allows unwanted communicators to be blocked in the future, and desired communicators to always get through successfully.

The phone number, address, or unique ID of the communicator may also be identified for future calls (such as in a call log that identifies blocked calls) to other recipients as well as the intended recipient of the inbound communication. That is, a match of an inbound communication to a type of fingerprint (unwanted vs. wanted) and/or carrier and number block score may be used to play an appropriate message (such as an out of service message for unwanted communicators) to communicators from the phone number, address, or unique ID, and an identifier (e.g., IRS Scam) may be used to provide an appropriate communicator ID (such as "IRS Scam"), which can be displayed in call logs and other places, even when the call has been blocked.

Figure 4:
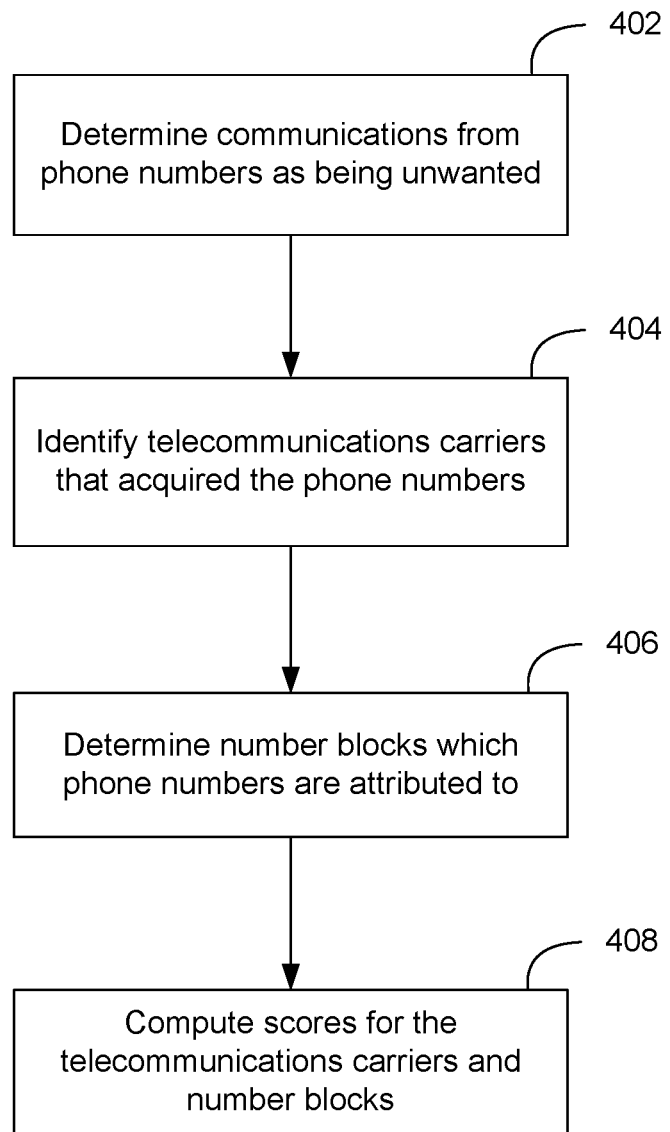
FIG. 4 illustrates a flowchart of a method for scoring telecommunications carriers or number blocks according to an embodiment of the present invention.

FIG. 4 presents a flowchart of a method for scoring telecommunications carriers or number blocks according to an embodiment of the present invention. A system may determine communications from one or more phone numbers as being unwanted, step 402. Determining the communications as being unwanted may include analyzing communication content features (or fingerprints) of communications associated with unwanted communicators and comparing them with the communications from the phone numbers.

Telecommunications carriers that acquired the phone numbers are identified, step 404. For example, the phone numbers may have been acquired by telecommunications carriers who sold or distributed the phone numbers to customers. Number blocks are determined for which the phone numbers are attributed to, step 406. The containing number blocks for the phone numbers are determined. For example, the phone numbers may be determined to belong to a series or a range of numbers in blocks of 10, 100, 1000, etc.

Scores for the telecommunications carriers and the number blocks are computed, step 408. The scores for the telecommunications carriers and number blocks may be computed based on an amount of the determined unwanted communications from the phone numbers. These scores may also be updated over time by performing continuous monitoring of certain phone numbers. As discussed herein, certain ones of telecommunication carriers may cater to robocaller customers. As such, an amount or percentage of unwanted communication traffic from phone numbers acquired by the telecommunication carriers may be tracked and used to compute scores for the telecommunication carriers and number blocks. The system may continuously monitor communications from phone numbers and adjust telecommunication carrier and number block scores accordingly such that a carrier or number block's status can change dynamically. The scores computed for the telecommunications carriers or number blocks may be used to screen calls.

Figure 5:
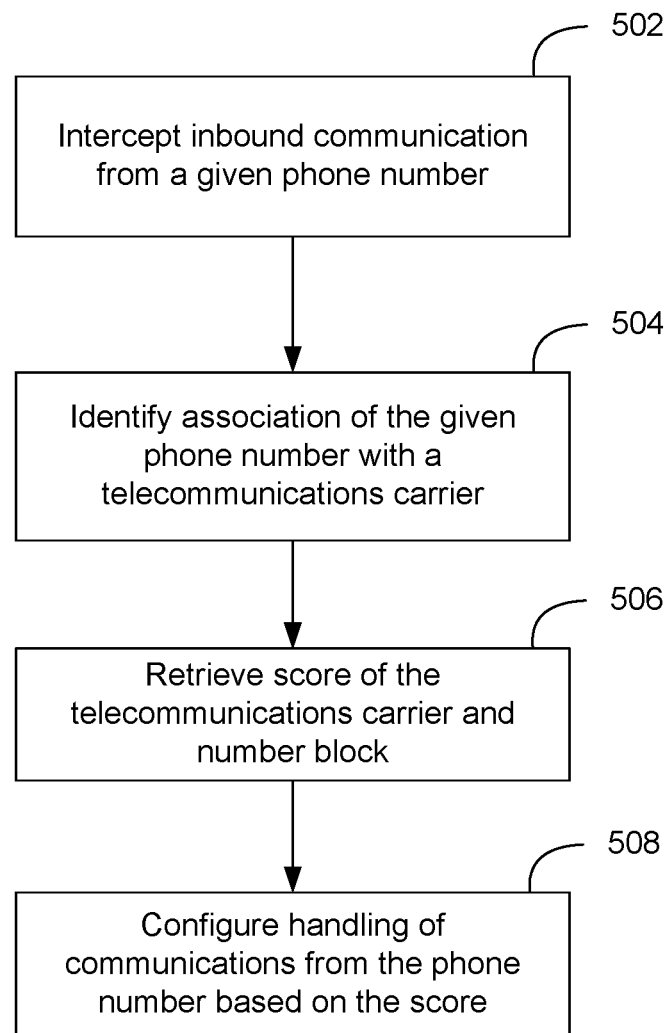
FIG. 5 illustrates a flowchart of a method for screening calls according to an embodiment of the present invention.

FIG. 5 illustrates a flowchart of a method for screening calls according to an embodiment of the present invention. A communication screening system may intercept an inbound communication from a given phone number, step 502. The inbound communication may be a voice call, short message service (SMS) text, or voice message that is directed to an intended recipient from a communicator using the given phone number. An association of the given phone number with a telecommunications carrier is identified, step 504. The association may include the telecommunications carrier being an acquirer of the given phone number.

The containing number block for a phone number is determined. For example, number blocks may be organized in blocks of 10, 100, 1000 or any size. As the owning carrier of a number is determined per step 504, the range belonging to that carrier may also be determined as well as any downstream assignment. In some cases, the carrier for a number may not be able to be determined but the number block is still relevant. For example, the phone number 000-500-1001 does not belong to a U.S. telecommunications carrier but as a number block may be used by an unwanted spam caller who in turn uses all numbers 000-500-1000 through 000-500-1999 in a given afternoon to place unwanted calls. As the first call in a given 1000 number block range is received and categorized, subsequent communications from other numbers within that block with a given time period may affect the scoring of that number block, whereby it may only take a few calls before that entire range is considered suspect and subjected to restrictions on how incoming communications from that number block are handled.

A score of the telecommunications carrier and number block are retrieved, step 506. The score may include an indication or frequency of unwanted communication traffic being associated with numbers that were acquired by the telecommunications carrier or belong to that number block. Handling of communications from the phone number is configured based on the score, step 508. The handling of communications from phone numbers associated with certain telecommunications carriers may vary. For example, certain scores may cause the communication screening system to prompt an audio challenge. Other scores may cause the communication screening system to forward communications to voice mail and label any recorded communication as potential spam. While a high score (e.g., high volume of unwanted traffic from the carrier) may cause the communication screening system to block communications or suppress auditory and/or visual indication of an incoming communication. FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for identifying communicators in a communication environment as wanted or unwanted, the system comprising:
 a directory server comprising memory and a processing device configured to:
  score telecommunications carriers based on the telecommunications carriers having unwanted communication traffic associated with phone numbers of unwanted communicators; and
 a communication screening system configured to:
  intercept an inbound communication from a given phone number,
  identify the given phone number is associated with a given one of the telecommunications carriers; and
  configure handling of communications from the phone number based on the scoring of the given telecommunications carrier.

2. The system of claim 1 wherein the directory server determines the scores of the telecommunications carriers based on a monitoring of traffic or reported instances of positive and negative communication behaviors associated with the telecommunications carrier.

3. The system of claim 1 wherein the communication screening system prompts for a response from the given phone number to record a digital sample.

4. The system of claim 3 wherein the communication screening system extracts data from the inbound communication to record the digital sample.

5. The system of claim 1 wherein the inbound communication includes a voice message.

6. The system of claim 1 wherein the communication screening system configures the handling of communications by at least one of suppression of visual or auditory indication of a communication, blocking the phone number, playing a message that indicates unavailability to the origination communication device, and ending a communication connection with the origination communication device.

7. The system of claim 1 wherein the communication screening system is configured to block ranges of numbers or matched patterns based on the phone number.

8. The system of claim 1 wherein the directory server compares the inbound communication to fingerprints stored in a database.

9. The system of claim 1 wherein the fingerprints comprise sequences of characters that are representative of content of known communications.

10. The system of claim 1 wherein the directory server dynamically computes the scores for the telecommunications carriers by tracking percentages of wanted and unwanted communications related to the telecommunications carriers.

11. The system of claim 1 wherein the directory server further:
 detects spoofing of the numbers associated with the communications associated with the unwanted communicators; and
 adjusts the scores for the telecommunications carriers based on the detection of spoofing.

12. A system for identifying communicators in a communication environment as wanted or unwanted, the system comprising:
 a processor; and
 a memory having executable instructions stored thereon that when executed by the processor cause the processor to:
  score telecommunications carriers based on the telecommunications carriers having unwanted communication traffic associated with phone numbers of wanted communicators,
  intercept an inbound communication from a given phone number,
  identify the given phone number is associated with a given one of the telecommunications carriers, and
  configure handling of communications from the phone number based on the scoring of the given telecommunications carrier.

13. A method, in a communication environment including a data processing system comprising a processor and a memory, for identifying communicators as wanted or unwanted, the method comprising:
 scoring, by the data processing system, telecommunications carriers based on the telecommunications carriers having unwanted communication traffic associated with phone numbers of wanted communicators;
 intercepting, by the data processing system, an inbound communication from a given phone number;
 identifying, by the data processing system, the given phone number is associated with a given one of the telecommunications carriers; and
 configuring, by the data processing system, handling of communications from the phone number based on scores of the given telecommunications carrier.

14. The method of claim 13 further comprising determining the score of the telecommunications carrier based on a monitoring of traffic or reported instances of positive and negative communication behaviors by the telecommunications carrier.

15. The method of claim 13 further comprising prompting for a response from the given phone number to record a digital sample.

16. The method of claim 15 further comprising extracting data from the inbound communication to record the digital sample.

17. The method of claim 13 wherein the inbound communication includes a voice message.

18. The method of claim 13 further comprising computing the scores for the telecommunications carriers by tracking percentages of wanted unwanted communications from the telecommunications carriers.

19. The method of claim 13 further comprising configuring the handling of communications by at least one of suppression of visual or auditory indication of a communication blocking the phone number, playing a message that indicates unavailability to the origination communication device, and ending a communication connection with the origination communication device.

20. The method of claim 13 further comprising blocking sets of number ranges or patterns based on the phone number.

21. A method, in a communication environment including a data processing system comprising a processor and a memory, for identifying communicators as wanted or unwanted, the method comprising:
determining communications from a first phone number as being likely unwanted,
determining the first phone number belongs to a block of a plurality of second phone numbers based on telecommunications carrier association, and
intercepting an inbound communication from a given phone number,
identifying the given phone number as being within the block of second phone numbers;
identifying the inbound communication as likely unwanted based on the identification that the given phone number is within the block of second phone numbers; and
handling the inbound communication as an unwanted communication.

22. The method of claim 21 wherein handling the inbound communication further comprises handling the inbound communication by at least one of suppression of visual or auditory indication of a communication, blocking the given phone number, playing a message that indicates unavailability to a communication device of the given phone number, and ending a communication connection with the communication device.

23. The method of claim 21 further comprising determining scores of the block of second phone numbers based on a monitoring of traffic or reported instances of positive and negative communication behaviors associated with the block of second phone numbers.

24. The method of claim 21 further comprising blocking the block of second phone numbers.

25. The method of claim 21 further comprising dynamically computing scores for the block of second phone numbers by tracking percentages of wanted and unwanted communications related to the block of second phone numbers.

* * * * *